United States Patent
Schuckert et al.

(10) Patent No.: US 8,036,810 B2
(45) Date of Patent: Oct. 11, 2011

(54) METHOD FOR DETERMINING THE QUALITY OF THE FUEL FOR AN INTERNAL COMBUSTION ENGINE

(75) Inventors: Marko Schuckert, Stuttgart (DE); Herbert Schumacher, Gerlingen (DE); Christos Hondros, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 356 days.

(21) Appl. No.: 12/291,771

(22) Filed: Nov. 12, 2008

(65) Prior Publication Data
US 2009/0292445 A1 Nov. 26, 2009

(30) Foreign Application Priority Data
Nov. 23, 2007 (DE) .......................... 10 2007 056 552

(51) Int. Cl.
*G06F 19/00* (2011.01)
(52) U.S. Cl. ......................... 701/103; 701/102; 701/104
(58) Field of Classification Search .................. 701/103, 701/104, 106, 101, 102; 702/187, 100; 123/297, 123/304, 478, 480, 27 R, 27 GE, 486, 494
See application file for complete search history.

(56) References Cited

U.S. PATENT DOCUMENTS
2008/0308067 A1* 12/2008 Schuckert et al. ............ 123/435
2009/0025689 A1* 1/2009 Ruggiano et al. ............ 123/491
2009/0198433 A1* 8/2009 Schumacher ................. 701/103

FOREIGN PATENT DOCUMENTS
DE  10 2007 019 280  11/2008

* cited by examiner

Primary Examiner — Stephen K Cronin
Assistant Examiner — Raza Najmuddin
(74) Attorney, Agent, or Firm — Kenyon & Kenyon LLP

(57) ABSTRACT

A method for determining the quality of the fuel for an internal combustion engine, in particular a direct-injection internal combustion engine in a vehicle, which is characterized by the following be performed: the internal combustion engine is operated in idle mode under predefinable operating conditions, the curve of the injection quantity, necessary for idling, over the engine temperature is determined, and the fuel quality is inferred from the curve of the injection quantity over the engine temperature.

19 Claims, 2 Drawing Sheets

METHOD FOR DETERMINING THE QUALITY OF THE FUEL FOR AN INTERNAL COMBUSTION ENGINE

RELATED APPLICATION INFORMATION

The present application claims priority to and the benefit of German patent application no. 10 2007 056552.8, which was filed in Germany on Nov. 23, 2007, the disclosure of which is incorporated herein by reference.

FIELD OF THE INVENTION

The present invention relates to a method for determining the quality of the fuel for an internal combustion engine, in particular a diesel engine of a vehicle. The present invention also relates to a computer program and a computer program product, which are suitable for carrying out the method.

BACKGROUND INFORMATION

Fuels for vehicles, in particular diesel fuels, exhibit to some extent significant differences in quality depending on the region (for example in the U.S., a significant variance in the cetane number and in the content of polyaromatics is possible). In addition to diesel fuel based on petroleum, they may also contain components of alternative fuels. For example, EU Directive 2003/30/EG prescribes a market share of 5.75% of alternative fuels. For example, bio-diesel based on rapeseed (RME—rape methyl ester), synthetic diesel fuels from biomass (BTL—biomass to liquid) or synthetic diesel fuels made from natural gas (GTL—gas to liquid) are added to diesel fuel based on petroleum. For example, GTL has already been established in the market as a 5% additive to mineral diesel fuel. RME as well as synthetic diesel fuel have different fuel densities and different specific calorific values than mineral diesel fuel. Due to the density and the differences in the specific calorific values, an excess quantity may be necessary for achieving a comparable engine torque and the same rotational speed. For unadapted data calibration, changes in the injection quantity may result in a higher exhaust gas temperature and/or for example in the impinging of the injected jet on the cylinder wall/combustion cavity of the piston, thus causing damage to the components and/or a deterioration in the exhaust gas characteristics. In addition, the proportion of combustion soot as well as the proportion of nitrogen oxide emissions is changed by the fuel additives, and often even improved compared with mineral fuel. These improvements cannot be exploited to the full extent. When using such fuels, the engine calibration is generally not tuned optimally with respect to emissions, fuel consumption, noise, or regarding the handling characteristics of a vehicle equipped with a similar internal combustion engine.

German patent application DE 10 2007 01 928.0 (which is not a prior publication) of the applicant discusses a method and a measuring device for determining the properties of liquids used in vehicles, in particular for determining the quality of fuel for vehicles, where the liquid, i.e., the fuel, is put into a rotational motion within a rotationally symmetric container, and where the characteristics of the liquid, in particular the quality of the fuel, are inferred from the change in the free surface of the liquid, in particular a lowering or rising of the surface of the liquid at the container wall and/or in the area of the axis of symmetry of the container.

German patent application DE 10 2007 01 928.1 (which is also not a prior publication) of the applicant discusses a method for monitoring the properties of the fuel of an internal combustion engine, in particular a self-igniting internal combustion engine, in which the temperature of the fuel is determined at least at one location of a fuel system and the instantaneous rate of decomposition of the fuel is inferred from this temperature.

In the near future, it is to be expected for several reasons that the fuel stability during the operation of the vehicle will be affected more than is the case today. On the one hand, the injection pressures will rise further. This results in an increase in the maximum fuel temperature and thus in a more rapidly declining stability of the fuel. On the other hand, larger proportions of bio-diesel will be added to the diesel fuel in the future. This proportion may be as high as 30%. Increased quantities of bio-diesel fuel reduce the resistance of the fuel against elevated temperatures.

SUMMARY OF THE INVENTION

An object of the exemplary embodiments and/or exemplary methods of the present invention is to provide a method for determining the quality of the fuel for an internal combustion engine, in particular a self-igniting internal combustion engine and very especially a diesel engine, which makes the determination of the fuel quality possible using simple means.

In this context, the term simple means refers not only to a simple way, but in particular which may be also without the use of additional sensor systems.

The method according to the present invention having the features described herein achieves this object by detecting the curve of the injection quantity necessary for idling over the engine temperature while the internal combustion engine is idling under predefined operating conditions and by inferring the fuel quality from this curve. In this approach, additional sensors for detecting the fuel quality, such as sensors that detect the acid content of the fuel, may be omitted. The engine temperature represents a quantity that is processed anyway in a control unit of the internal combustion engine because this temperature must be known for proper functioning of the internal combustion engine.

It must be ensured that defined operating conditions exist for this purpose, under which a detection of the injection quantity over the engine temperature is possible in a reproducible manner. The predefined operating conditions may be characterized by one or several of the following preconditions being met:
  there is no exhaust gas recirculation system or the exhaust gas recirculation system is deactivated,
  there is no build-up of boost pressure, i.e., the turbocharger and/or the compressor are not running, and
  there exists a well defined load on the vehicle electrical system.

Under all these operating conditions, the injection quantity over the engine temperature may be detected in such a way that one may infer the fuel quality from this curve in a manner still to be explained in greater detail below.

Extensive tests have shown that the curve of the injection quantity over the engine temperature is dependent on the fuel used and thus on the fuel quality used. Specific curves of the injection quantity over the engine temperature are characteristic of different fuel qualities.

As a pure matter of principle, different possibilities for analyzing the curve of the injection quantity over the engine temperature are conceivable. A very advantageous specific embodiment provides for the temperature gradient of the injection quantity to be determined and to infer the fuel quality from this gradient. Thereby, an increasingly poor fuel quality is inferred from an increasing gradient.

As a pure matter of principle, the above-described method may be repeated from time to time, even if no fueling action has taken place, in order to check whether the fuel quality has changed, for example due to decomposition of the fuel. In any case, a very advantageous specific embodiment provides for the temperature gradient to be determined after each fueling and the fuel quality to be thus determined after each fueling action.

After completing the determination of the fuel quality, it may be stored and/or output, for example, and, in the event of inferior quality, which may be displayed to the driver on a display together with a corresponding warning message.

In an advantageous embodiment of the method, variables that characterize the combustion processes of the internal combustion engine are changed accordingly or adapted to the fuel quality, in order to ensure a trouble-free operation of the internal combustion engine, independently of whether the fuel quality is stored and/or displayed.

Exemplary embodiments of the invention are depicted in the drawings and described in greater detail below.

DETAILED DESCRIPTION

Figure 1:
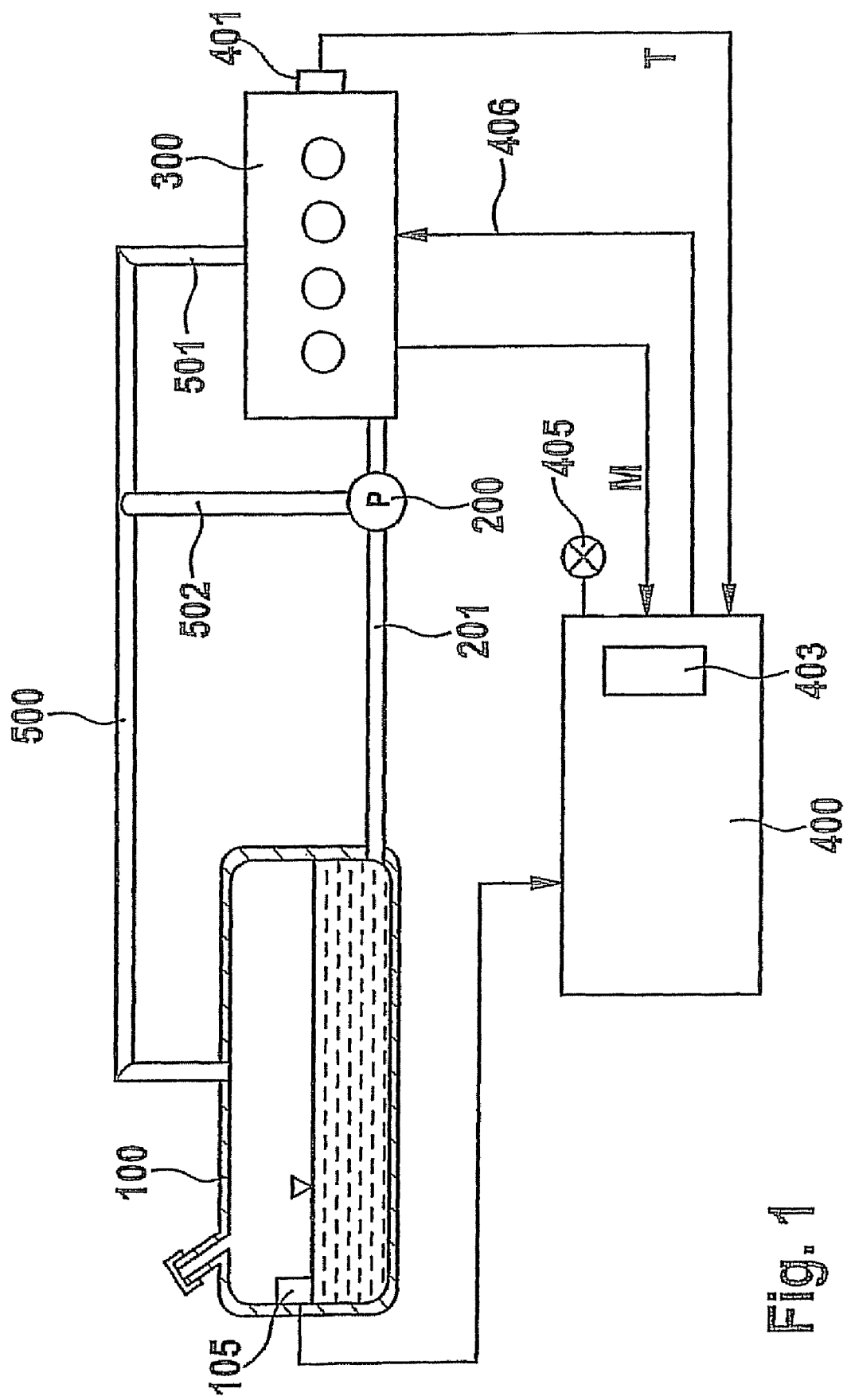
FIG. 1 shows the fuel system of a vehicle, in which the method according to the present invention is used.

A fuel system of a vehicle, as depicted in FIG. 1, includes a fuel tank 100 for storing the fuel of an internal combustion engine 300, in particular for storing diesel fuel for an internal combustion engine 300 with direct injection. The fuel is fed in an essentially known manner via a line system 201 with the aid of a high-pressure pump 200 to injectors (not shown) of internal combustion engine 300, for example via a pressure reservoir (not shown), a so-called common rail. A return line 501 originates at internal combustion engine 300 and a return line 502 originates at pump 200, both discharging into a common line 500 that leads to a fuel tank 100. Fuel tank 100 includes a liquid level sensor 105, whose output signal is supplied to control unit 400.

With the aid of a temperature sensor 401, which detects for example the temperature of the cooling water of internal combustion engine 300 or its engine oil temperature or another variable that characterizes the temperature of internal combustion engine 300, several sensors may also be provided, i.e., sensor 401 shown in FIG. 1 represents either one or several sensors, the temperature of the internal combustion engine is detected and supplied to control unit 400. In addition, injection quantity M is supplied to control unit 400.

In control unit 400, the time characteristic of injection quantity M is recorded as a function of temperature T and analyzed in the manner described below.

During fueling, fuel is introduced into tank 100. This fuel may be of very different qualities, with the corresponding consequences for the combustion process. For example, fuels of inferior quality may cause irreversible damage, for example to the injection system of diesel engines, and/or the proper operation of the internal combustion engine during the driving operation of a vehicle is not ensured, which not only has negative effects on the driving comfort but in particular is also very disadvantageous for the emission characteristics of the internal combustion engine. A method for determining the fuel quality is provided and will be described in greater detail below in combination with FIG. 2.

In a first step 100, which takes place immediately after fueling or also from time to time during the operation of internal combustion engine 300, the method is started. In a first inquiry 110, a check is made as to whether the internal combustion engine is idling. If this is not the case, then a jump back to before inquiry 110 is performed. If this is the case, then in a second inquiry 120, a check is made as to whether predefined operating states exist. These operating states are characterized for example by the following conditions: an exhaust gas recirculation system is switched off or does not exist; there is no build-up of boost pressure, for example by a turbocharger and/or a compressor; there exists a defined load on the vehicle electrical system, i.e., there are no start-up and/or shut-down processes of electrical consumers taking place.

If these preconditions are not satisfied, then a jump to before step 110 is performed. If on the other hand the preconditions are satisfied, i.e., if an idling condition exists and the predefined operating conditions have been implemented, then injection quantity M that is necessary for idling is determined as a function of temperature T in step 131. Temperature T is determined—as described above—via the temperature of the cooling water, which is detected anyway, or via the temperature of the engine oil, which in many cases is also detected. The temperature gradient of injected quantity G=dM/dT is subsequently determined in a step 132. In step 140, a check is made as to whether this temperature gradient of injected quantity G is greater than a predefinable threshold value $G_S$.

If this is not the case, then in step 150 a message to the effect that the fuel quality is good is output and possibly also stored in a memory 403 of control unit 400, which can later be read out for diagnostic purposes, and a jump-back to before step 110 is performed. It is to be noted that this output, which is displayed to the driver, for example in a display instrument 405 in the vehicle, may also be omitted.

In this case, process step 150 is skipped completely. If, on the other hand, the temperature gradient of injected quantity G exceeds threshold value $G_S$, then a message to the effect that the fuel quality is poor is output to the driver in step 160 and possibly stored in memory 403, and in a subsequent procedure 170, variables that characterize the combustion process, such as the injection quantity, the point of injection, etc., are changed in such a way that the combustion process is adapted to the inferior fuel quality. This is indicated by a signal arrow 406 in FIG. 1. In this case, process step 160 may be omitted as well, so that in the case of inferior quality, procedure 170 is started immediately, this procedure enabling an adaptation of the combustion processes to the fuel quality. Subsequently, a jump-back to before step 110 is performed.

Figure 2:
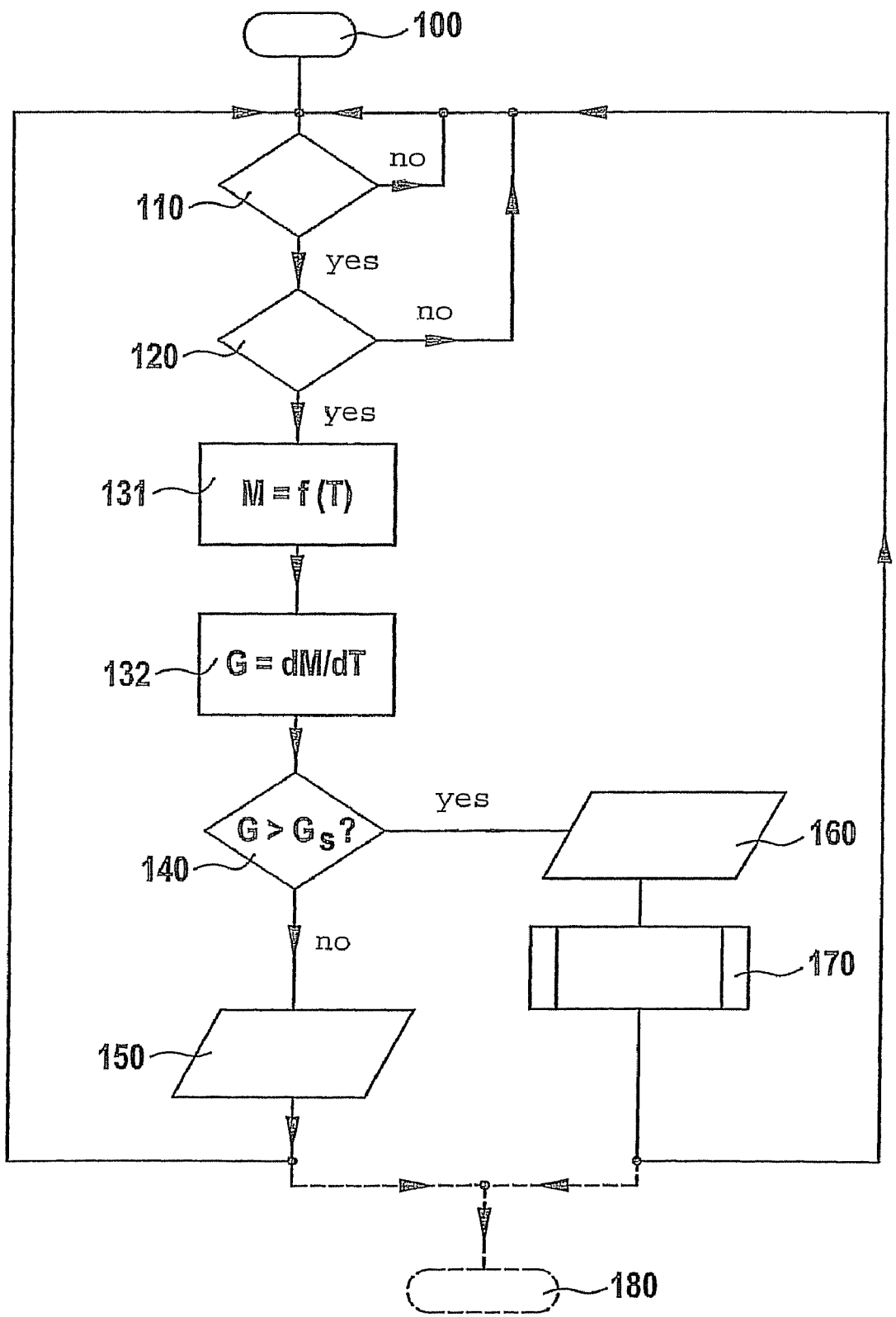
FIG. 2 shows a flow chart of a method according to the present invention.

As soon as the idling operation of the vehicle is terminated, the process steps described above are not performed anymore, but instead the method described above, which may be implemented as a procedure of the controller of an internal combustion engine and may be stored in the control unit, is effectively in stand-by mode of operation until an idling operation is present again. It is understood that instead of a jump-back after output 150 or a jump-back to before step 110 after completing procedure 170, the method may also be terminated in a step 180, which is indicated in FIG. 2 by dashed lines. In this case, the procedure is always started from step 100, for example if fueling has been detected or if the control unit receives a request for determining the fuel quality.

The method is based on the realization that the temperature gradient of injected quantity G rises with increasingly poor fuel quality. A high gradient G thus indicates the presence of a fuel of inferior quality and a small gradient G indicates the presence of a fuel of high quality. In the case of a fuel of inferior quality, the variables that characterize the combustion, i.e., the injection quantity, the point of injection, the number and sequence of injections, the rail pressure, the glow temperature in the case of a diesel engine, the start-up and shut-down of the exhaust gas recirculation system and possibly additional variables, are adapted to the poor fuel quality.

The method described above may be implemented as a computer program in a computing device, in particular in control unit 400, and be executed therein. The computer program code may be stored on a machine-readable data storage medium that may be read by control unit 400. In this respect, the method may also be retrofitted because additional sensors besides sensor 401, which exists anyway and measures the temperature of the cooling water, or a corresponding sensor that measures the temperature of the engine oil, are not necessary.

What is claimed is:

1. A method for determining a quality of fuel for a direct-injection internal combustion engine of a vehicle, the method comprising:
   operating the internal combustion engine in idle mode under predefinable operating conditions;
   determining a curve of an injection quantity, which is necessary for idling, over engine temperature; and
   inferring the fuel quality from the curve of the injection quantity over the engine temperature.

2. The method of claim 1, wherein the predefined operating conditions are characterized by at least one of the following preconditions being met:
   a defined exhaust gas recirculation system exists;
   a defined boost pressure has been built up; and
   a defined voltage exists in the vehicle electrical system.

3. The method of claim 1, wherein a temperature gradient of the injection quantity is determined from the curve of the injection quantity over the engine temperature and the fuel quality is inferred from this gradient.

4. The method of claim 3, wherein an increasingly poor fuel quality is inferred from an increase in the gradient.

5. The method of claim 3, wherein the temperature gradient is determined after each fueling.

6. The method of claim 3, wherein variables which characterize combustion processes of the internal combustion engine are modified as a function of the temperature gradient.

7. The method of claim 6, wherein the variables which characterize the combustion processes of the internal combustion engine are formed by at least one of the following variables: a triggering start, a rail pressure, a glow temperature, and an existence of an exhaust gas recirculation system.

8. The method of claim 6, wherein the variables which characterize the combustion processes of the internal combustion engine are modified if the gradient exceeds a predefinable threshold value.

9. The method of claim 1, wherein the engine temperature is determined from at least one of a measured temperature of the cooling water and a measured oil temperature.

10. A device for determining a quality of fuel for a direct-injection internal combustion engine of a vehicle, comprising:
    a control unit having program code for performing the following:
    operating the internal combustion engine in idle mode under predefinable operating conditions;
    determining a curve of an injection quantity, which is necessary for idling, over engine temperature; and
    inferring the fuel quality from the curve of the injection quantity over the engine temperature.

11. A non-transitory computer readable medium having program code which is executable by a processor of a control unit, comprising:
    a program code arrangement having program code for performing the following:
    operating the internal combustion engine in idle mode under predefinable operating conditions;
    determining a curve of an injection quantity, which is necessary for idling, over engine temperature; and
    inferring the fuel quality from the curve of the injection quantity over the engine temperature.

12. The device of claim 10, wherein the predefined operating conditions are characterized by at least one of the following preconditions being met:
    a defined exhaust gas recirculation system exists;
    a defined boost pressure has been built up; and
    a defined voltage exists in the vehicle electrical system.

13. The device of claim 10, wherein a temperature gradient of the injection quantity is determined from the curve of the injection quantity over the engine temperature and the fuel quality is inferred from this gradient.

14. The device of claim 13, wherein an increasingly poor fuel quality is inferred from an increase in the gradient.

15. The device of claim 13, wherein the temperature gradient is determined after each fueling.

16. The device of claim 13, wherein variables which characterize combustion processes of the internal combustion engine are modified as a function of the temperature gradient.

17. The device of claim 16, wherein the variables which characterize the combustion processes of the internal combustion engine are formed by at least one of the following variables: a triggering start, a rail pressure, a glow temperature, and an existence of an exhaust gas recirculation system.

18. The device of claim 16, wherein the variables which characterize the combustion processes of the internal combustion engine are modified if the gradient exceeds a predefinable threshold value.

19. The device of claim 10, wherein the engine temperature is determined from at least one of a measured temperature of the cooling water and a measured oil temperature.

* * * * *